US005179388A

United States Patent [19]

Shiokawa et al.

[11] Patent Number: 5,179,388

[45] Date of Patent: Jan. 12, 1993

[54] MULTIPLE-USE THERMAL IMAGE TRANSFER RECORDING METHOD

[75] Inventors: Kei-ichi Shiokawa, Numazu; Youji Ide, Mishima, both of Japan

[73] Assignee: Ricoh Company, Ltd., Tokyo, Japan

[21] Appl. No.: 723,340

[22] Filed: Jun. 28, 1991

[30] Foreign Application Priority Data

Jun. 29, 1990 [JP] Japan .................................. 2-171323

[51] Int. Cl.[5] .................................................. G01D 9/00

[52] U.S. Cl. ........................................ 346/1.1; 400/241

[58] Field of Search ................. 346/76 PH; 400/241.2

[56] References Cited

U.S. PATENT DOCUMENTS 4,672,393 6/1987 Uchikata et al. ................. 400/241.2
4,890,120 12/1989 Sasaki et al. ................... 346/76 PH

FOREIGN PATENT DOCUMENTS 54-68253 6/1979 Japan .
55-105579 8/1980 Japan .
0108184 6/1983 Japan ................................ 400/241.2
58-212993 12/1983 Japan .
60-40293 3/1985 Japan .
60-127191 7/1985 Japan .
60-127192 7/1985 Japan .
0189488 9/1985 Japan .
0078670 4/1986 Japan ................................ 400/241.2
62-1573 1/1987 Japan .
2284788 12/1987 Japan ................................ 400/241.2
0162285 7/1988 Japan .

*Primary Examiner*—Benjamin R. Fuller
*Assistant Examiner*—N. Le
*Attorney, Agent, or Firm*—Oblon, Spivak, McClelland, Maier & Neustadt

[57] ABSTRACT

A thermal image transfer recording method consisting of the steps of bringing a line thermal head into contact with a multiple-use thermal image transfer recording medium with Young's modulus of 1,200 kg/mm$^2$ or more in both the lengthwise and crosswise directions, which comprises a support and an ink layer formed thereon, with the back side of the support of the recording medium being directed to the thermal head, and applying thermal energy from the line thermal head to at least the same portion of the recording medium, thereby causing an ink component contained in the ink layer at least from the same portion of the recording medium to transfer to an image-receiving medium.

13 Claims, 2 Drawing Sheets

MULTIPLE-USE THERMAL IMAGE TRANSFER RECORDING METHOD

BACKGROUND OF THE INVENTION

1. Field of the Invention

This invention relates to a multiple-use thermal image transfer recording method capable of yielding images by using a thermal image transfer recording medium repeatedly, and more particularly to a thermal image transfer recording method capable of yielding images with the employed thermal image transfer recording medium not creased nor broken while provided with the thermal energy from a line thermal head in the course of the repeated operations of thermal printing.

2. Discussion of Background

Recording apparatus, such as a printer and a facsimile apparatus, using a thermal image transfer recording method, is now widely used. This is because the recording apparatus of this type is relatively small in size and can be produced inexpensively, and the maintenance is simple.

In a conventional thermal image transfer recording medium for use with the thermal image transfer recording apparatus, a single ink layer is merely formed on a support. When such a recording medium is used for printing images, the portions of the ink layer heated by a thermal head are completely transferred to an image receiving sheet at only one-time printing, so that the recording medium can be used only once, and can never be used repeatedly. The conventional recording medium is thus disadvantageous from the viewpoint of running cost.

In order to overcome the above drawback in the prior art, there have been proposed the following methods:

(1) A microporous ink layer containing a thermofusible ink is formed on a support so that the ink can gradually ooze out from the ink layer as disclosed in Japanese Laid-Open Patent Applications 54-68253 and 55-105579;

(2) A porous film is provided on an ink layer formed on a support so that the amount of an ink which oozes out from the ink layer can be controlled as disclosed in Japanese Laid-Open Patent Application 60-40293; and (3) An adhesive layer is interposed between an ink layer and a support so that an ink in the ink layer can be gradually exfoliated in the form of a thin layer from the ink layer when images are printed as disclosed in Japanese Laid-Open Patent Applications 60-127191 and 60-127192.

However, most of the conventional methods have been developed in such a fashion as to be suitable for use with a serial thermal head in a recording apparatus such as a word processor. Therefore, when those methods are applied to a line thermal head for use in a recording apparatus such as a facsimile apparatus and a bar code printer, the width of the employed thermal image transfer recording medium is necessarily increased and thermal deformation of the thermal image transfer recording medium is inevitable because the time elapsed before the thermal image transfer recording medium is separated from an image-receiving sheet is relatively long after the image transfer recording medium is brought into contact with the image-receiving sheet under application of heat thereto. Because of such thermal deformation of the thermal image transfer recording medium, the recording medium is easily caused to become creased or folded while it is reeled after one-time thermal printing. In addition, a portion of the recording medium to which the thermal energy has been applied is readily stretched. Consequently, the printed image becomes blurred when the above-mentioned thermal image transfer recording medium is repeatedly used and the thermal image transfer recording medium itself is disadvantageously tore at the final stage.

SUMMARY OF THE INVENTION

Aocordingly, an object of this invention is to provide a multiple-use thermal image transfer recording method capable of repeatedly yielding images with high density for use with a multiple-use thermal image transfer recording medium, which is not creased nor broken even under a high load of heat history while provided with the thermal energy from a line thermal head.

This object of the present invention can be attained by a multiple-use thermal image transfer recording method comprising the steps of (i) bringing a line thermal head into contact with a multiple-use thermal image transfer recording medium with Young's modulus of 1,200 $kg/mm^2$ or more in both the lengthwise and crosswise directions, which comprises a support and an ink layer formed thereon, with the back side of the above-mentioned support of the recording medium being directed to the thermal head, and (ii) applying thermal energy from the line thermal head to at least the same portion of the recording medium, thereby causing an ink component contained in the ink layer at least from the same portion of the recording medium to transfer to an image-receiving medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
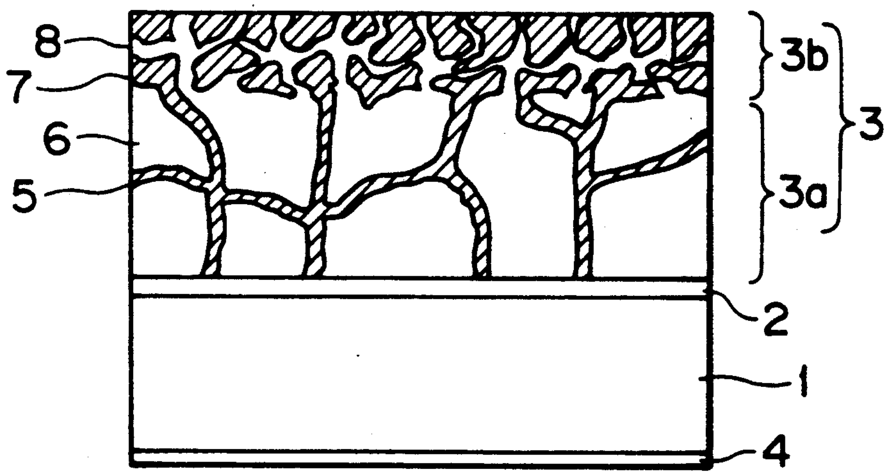
FIG. 1 is a schematic partial cross-sectional view of a multiple-use thermal image transfer recording medium for use in the present invention.
Figure 2:
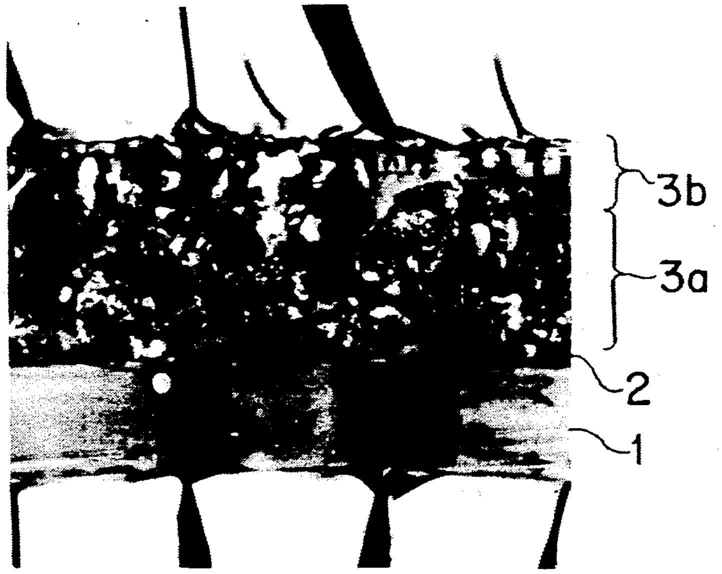
FIG. 2 is a photograph of a cross-section of a multiple-use thermal image transfer recording medium obtained in Preparation Example 1, taken by a transmission-type electron microscope (TEM) at a 2,200× magnification.

The multiple-use thermal image transfer recording method of the present invention will now be explained in detail.

The multiple-use thermal image transfer recording medium for use in the present invention is, for example, available in the form of a roll, and reeled out during the recording operation.

A line thermal head is brought into contact with the back side of the support of the thermal image transfer recording medium, and a first thermal image transfer recording operation is carried out with the thermal energy from the line thermal head being applied to the recording medium until the thermal image transfer recording medium i the form of a roll is entirely moved from, for example, a reel (A) to a reel (B). The ink component contained in the ink layer of the recording medium is transferred to an image-receiving sheet when the thermal energy from the line thermal head is applied to the ink layer. In the next recording operation, the recording medium is driven to reversely move, that is, from the reel (B) to the reel (A), or it is driven to move in the same direction from the reel (A) to the reel (B) as in the previous recording operation after it is once returned to the reel (A). The ink component contained in the ink layer at least from the same portion thereof is caused to transfer to the image-receiving medium. Such recording operations are continued in the present invention.

The aforementioned thermal image transfer recording medium for use in the present invention has Young's modulus of 1,200 $kg/mm^2$ or more in both the lengthwise and crosswise directions.

When the Young's modulus of the thermal image transfer recording medium is less than 1,200 $kg/mm^2$ in the lengthwise and crosswise directions, the thermal deformation of the recording medium is accumulated as the thermal recording proceeds, and the thermal image transfer recording medium becomes creased when rolled around the reels, and more unfavorably, the recording medium is torn. In addition, the portions of the recording medium to which thermal energy is repeatedly applied are stretched, thereby producing vague images.

The multiple-use thermal image transfer recording medium for use in the present invention will now be described.

It is preferable to use a material having high Young's modulus for the support. For instance, a polyester film with a thickness of 4 to 6 μm, which is generally used as a support, has Young's modulus of approximately 300 to 600 $kg/mm^2$. The ink layer formed on the support is therefore required to compensate for lack of the desired Young's modulus, so that the materials capable of imparting high rigidity and mechanical strength to the recording medium are selected for the ink layer.

The ink layer of the multiple-use thermal image transfer recording medium for use in the present invention comprises (i) a lower image transfer portion located in the vicinity of the support, comprising a three-dimensional network structure of a resin (hereinafter referred to as the resin network structure) and a thermofusible ink component which is held within the resin network structure, and (ii) an upper image transfer portion located on top of the lower image transfer portion, comprising a fine porous resin structure of a resin (hereinafter referred to as the porous resin structure), and a thermofusible ink which is held within the porous resin structure, and the resin network structure is at least partially connected to the porous resin structure and the support.

In this recording medium, since the resin network structure in the lower image transfer portion can hold therein a large amount of a thermofusible ink and therefore can constantly supply the ink to the porous resin structure of the upper image transfer portion, which makes it possible to repeatedly conduct the thermal printing operations over an extended period of time.

Furthermore, since the porous resin structure of the upper image transfer portion and the support ar connected by the resin network structure of the lower image transfer portion, the rigidity of the ink layer is increased as a whole, and thermal deformation of the recording medium can be therefore effectively avoided even though the thermal energy is concentratedly applied to the same portion of the recording medium in the course of the repeated printing operations by use of a line thermal head.

In addition, the upper image transfer portion of this recording medium has a fine porous resin structure in which a thermofusible ink is held, so that the amount of the ink which is transferred to an image receiving sheet can be well controlled.

In the present invention, the lower image transfer portion and the upper image transfer portion can be formed in an integrated form without any particular interface therebetween. Alternatively, the lower image transfer portion and the upper image transfer portion can be in the form of a layer, which are successively overlaid on the support as long as the two layers are integrated in the above-mentioned fashion. In this embodiment, high rigidity of the ink layer can also be maintained.

Referring now to the accompanying drawing, the present invention will be explained in detail.

FIG. 1 is a partial cross-sectional view of a multiple-use thermal image transfer recording medium for use in the present invention. In this figure, reference numeral 1 denotes a support which may be provided with a heat-resistant protective layer 5. In addition, an adhesive layer 2 may be formed on the support 1 and the thus integrated support 1+2 can be used as a support.

On the support 1, there is provided (i) a lower image transfer portion 3, which comprises a resin network structure 6 and a thermofusible ink 8 which is held within the resin network structure 6, and (ii) an upper image transfer portion 4, which comprises a fine porous resin structure 10 and a thermofusible ink 12 which is held within the fine porous resin structure 10, and which thermofusible ink 12 may be the same or different from the thermofusible ink 8 in the resin network structure 6. As mentioned previously, the support 1 (or 1+2) and the upper image transfer portion 4 are connected by the resin network structure 6 of the lower image transfer portion 3.

The preparation of the multiple-use image transfer recording medium for use in the present invention, as shown in FIG. 1, will now be explained.

The lower image transfer portion can be prepared, for instance, by mixing a resin for forming the resin network structure and a thermofusible ink in the form of a gel, coating the above-prepared mixture on the support and drying it. A blowing agent may be contained in the mixture. In the case where the blowing agent is contained in the mixture, the coated mixture is expanded after drying the same, so that the desired formation of the resin network structure can be achieved in the lower image transfer portion.

Subsequently, the upper image transfer portion can be prepared, for instance, by mixing a resin for forming the porous resin structure and a thermofusible ink in the form of a gel or in an immiscible state with the resin at an appropriate mixing ratio, coating the above-prepared mixture on the lower image transfer portion and drying the coated mixture.

Thereafter, the thermal image transfer recording medium is heated to a temperature near to the softening point of the resin employed for the resin network structure of the lower image transfer portion. Thus, the upper image transfer portion and the support are connected by the lower image transfer portion.

Conventionally known heat-resistant materials can be used for the support of the recording medium for use in the present invention. Examples of such materials include a film of plastics such as polyester, polycarbonate, triacetyl cellulose, nylon and polyimide, and a sheet of cellophane, parchment paper or condenser paper. In particular, films with a large Young's modulus, for example, polyethylene terephthalate (PET), polyimide (PI), polyether ether ketone (PEEK) and polyethylene naphthalate (PEN) are preferred.

It is preferable that the thickness of the support be in the range of about 2 to 15 μm from the viewpoints of thermal sensitivity and mechanical strength.

It is possible to improve the heat resistance of the recording medium by providing, as shown in FIG. 1, a heat-resistant protective layer 5 on the back side of the support 1, with which side a thermal head is brought into contact. The heat-resistant protective layer 5 can be prepared from silicone resin, fluorine-containing resin, polyimide resin, epoxy resin, phenolic resin, melamine resin or nitrocellulose.

The thermofusible ink which is contained in the lower image transfer portion 3 serving as an ink-supply layer (hereinafter referred to as a first ink layer) and the upper image transfer portion 4 serving as an ink-transfer layer (hereinafter referred to as a second layer) comprises a coloring agent and a vehicle.

The coloring agent can be selected from conventionally known pigments and dyes. Of the known pigments, carbon black and phthalocyanine pigments are preferably used. Among the known dyes, direct dyes, acid dyes, basic dyes, disperse dyes and oil-soluble dyes are preferably used.

Examples of the vehicle for dispersion of the above coloring agent include natural waxes such as beeswax, carnauba wax, whale wax, Japan wax, candelilla wax, rice bran wax and montan wax; paraffin wax, microcrystalline wax, oxidized wax, ozocerite, ceresine wax, and ester wax. In addition to the above, higher fatty acids such as margaric acid, lauric acid, myristic acid, palmitic acid, stearic acid, fromic acid and behenic acid, higher alcohols such as stearyl alcohol and behenyl alcohol, esters such as sorbitan fatty acid ester, and amides such as stearic amide and oleic amide can also be employed.

The gelling of the thermofusible ink can be performed by a solvent dispersing method, a hot-melt dispersing method, and a method using a gelation agent.

In the case of the solvent dispersing method, a composition of the thermofusible ink is dispersed in a proper solvent at an appropriately high temperature, followed by cooling the dispersion to room temperature. It is preferable to disperse the thermofusible ink at temperatures between 25° to 40° C. for obtaining desired gelling effect of the thermofusible ink and ensuring the safety in the preparation of the recording medium. When cooling the above-mentioned dispersion, the dispersion may be allowed to stand at room temperature.

The thermofusible ink can also be gelled by using a gelation agent such as a glycerol fatty acid ester. The amount of the gelation agent to be added to the thermofusible ink composition is preferably 5 to 50 wt.% of the total weight of the solid content of the thermofusible ink composition.

When the hot-melt dispersing method is employed, the components of the thermofusible ink, that is, the coloring agent and the vehicle are mixed at an elevated temperature in a roll mill, a sand mill or an attritor. Of these, a sand mill is preferred because homogeneous dispersing can be attained most effectively. After mixing the coloring agent and the vehicle, the mixture is dispersed in a vessel heated to a temperature higher than the melting point of the employed vehicle by 10° to 20° C., under application of high shearing force. After dispersion over an appropriate period of time, the dispersion may be allowed to stand at room temperature, or a proper diluent and vehicle may be added thereto under application of heat. Then, the resultant mixture is dispersed again at temperatures of 25° to 35° C. The thus obtained dispersion is cooled to room temperature, whereby a gelled thermofusible ink is prepared.

As the resin in the resin network structure 6 of the lower image transfer portion (first ink layer), and the resin in the porous resin structure 10 of the upper image transfer portion (second ink layer), resins having a glass transition temperature higher than the melting point of the thermofusible gelled ink for use in the present invention can be employed. Examples of such resins include vinyl chloride resin, vinyl chloride - vinyl acetate copolymer, polyester resin, epoxy resin, polycarbonate resin, phenolic resin, polyimide resin, cellulose resin, polyamide resin and acrylic resin.

In order to facilitate the formation of the resin structure of the thermal image transfer recording medium for use in the present invention, it is preferable to use a blowing agent.

Preferable examples of such blowing agents are azo compounds, which are capable of uniformly forming pores in the image transfer portions 3 and 4, such as azodicarbonic amide, azobisisobutyronitrile, azocyclohexyl nitrile, diazoaminobenzene and barium diazocarboxylate.

In order to control the expansion temperature and the expansion efficiency of such blowing agents, a blowing accelerating agent such as zinc oxide and a variety of stearates and palmitates, and a plasticizer such as dioctyl phthalate may be further added, if necessary.

The amount of such a blowing agent is not specifically limited. However, it is preferable that such a blowing agent be added in an amount of 5 to 30 wt.% to the entire amount of the solid content of the resin and the thermofusible gelled ink in the lower image transfer portion 3 and the upper image transfer portion 4 in view of the formation of voids or pores in those image transfer portions 3 and 4. This is because the image transfer performance and the mechanical strength of the thermal image transfer recording medium tend to depend upon the density of voids or pores in those image transfer portions. In other words, there is a tendency that the more the voids or pores, the higher the image transfer performance, but the less the mechanical strength of the image transfer recording medium.

The lower image transfer portion (first ink layer) and the upper image transfer portion (second ink layer) can also be formed not only by using the above-mentioned blowing agent, but by employing a method in combination therewith in which a mixture of the resin and the thermofusible gelled ink constituting the lower image transfer portion (first ink layer), or a mixture of the resin and the thermofusible ink constituting the upper image transfer portion (second ink layer) is separately dissolved in a mixed solvent of a solvent with a high volatility and a solvent with a low volatility, and each mixture is coated and dried.

The thickness of the lower image transfer portion 3 (first ink layer) is preferably in the range of 3 to 15 μm from the viewpoints of thermal sensitivity and printing performance when repeatedly used, although it can be determined depending upon how many times the recording medium is to be used for image printing. As to the upper image transfer portion 4 (second ink layer), the thinner, the better for image transfer, but it is preferable that the thickness be in the range of 1 to 5 μm.

In the present invention, as shown in FIG. 1, an adhesive layer 2 may also be provided on the support 1. By means of the adhesive layer 2, the lower image transfer portion 3 (first ink layer) can be firmly fixed on the support 1.

Examples of the materials for the adhesive layer 2 include ethylene - vinyl acetate copolymer, vinyl chloride - vinyl acetate copolymer, ethylene - acrylate copolymer, polyethylene, polyamide, polyester, petroleum resin and nylon. These materials can be used alone or in combination.

The thickness of the adhesive layer 2 is preferably in the range of 0.2 to 2.0 μm from the viewpoints of the adhesiveness of the adhesive layer 2 and the thermal sensitivity of the formed thermal image transfer recording medium.

Other features of this invention will become apparent in the course of the following description of exemplary embodiments, which are given for illustration of the invention and are not intended to be limiting thereof.

PREPARATION EXAMPLE 1

Formation of Support

One surface of a 4.5-μm thick polyethylene terephthalate film with Young's modulus of 500 kg/mm$^2$ in the lengthwise direction and 550 kg/mm$^2$ in the crosswise direction was coated with a silicone resin, whereby a support provided with a heat-resistant protective layer was prepared.

Formation of First Ink Layer

A mixture of the following components was dispersed in a mixed solvent of toluene and methyl ethyl ketone to obtain a dispersion:

| | Parts by Weight |
|---|---|
| Carbon black | 15 |
| Candelilla wax | 60 |
| Oxidized polyethylene wax | 25 |
| Vinyl chloride - vinyl acetate copolymer | 20 |
| Azobisisobutyronitrile | 20 |

The thus obtained dispersion was coated on the above prepared support on the opposite side to the heat-resistant protective layer, and dried, whereby a first ink layer with a thickness of 10 μm was formed, which served as an ink-supply layer.

Formation of Second Ink Layer

A mixture of the following components was dispersed in a mixed solvent of toluene and methyl ethyl ketone to obtain a dispersion:

| | Parts by Weight |
|---|---|
| Carbon black | 15 |
| Candelilla wax | 65 |
| Oxidized polyethylene | 20 |
| Vinyl chloride - vinyl acetate copolymer | 35 |

The thus obtained dispersion was coated on the above prepared first ink layer, and dried, whereby a second ink layer with a thickness of 5 μm was formed, which served as an ink transfer layer, whereby a multiple-use thermal image transfer recording medium No. 1 was prepared.

PREPARATION EXAMPLE 2

The procedure for formation of the support and the first ink layer employed in Preparation Example 1 was repeated.

A mixture of the following components was prepared to obtain a thermofusible ink for a second ink layer:

| | Parts by Weight |
|---|---|
| Carbon black | 15 |
| Candelilla wax | 70 |
| Monoglyceride of lanolin fatty acid | 15 |

The above-prepared thermofusible ink was added to vinyl chloride - vinyl acetate copolymer in an amount of 50 wt.%, so that a composition of the second ink layer was obtained. The thus obtained composition was coated on the first ink layer, and dried, whereby a second ink layer with a thickness of 5 μm, holding the thermofusible ink therein, was formed, which served as an ink transfer layer, whereby a multiple-use thermal image transfer recording medium No. 2 was prepared.

PREPARATION EXAMPLE 3

Preparation of Thermofusible Gelled Ink

The following components were placed in a sand mill vessel and dispersed at 110° C. to prepare a homogeneous ink composition.

| | Parts by Weight |
|---|---|
| Carbon black | 15 |
| Candelilla wax | 60 |
| Oxidized polyethylene wax | 23 |
| Terpene resin (dispersing agent) | 2 |

After decreasing the temperature of the thus obtained ink composition to 65° C., 10 parts by weight of benzol black, which is an oil-soluble dye with a low melting point, and 675 parts by weight of a mixed solvent of methyl ethyl ketone and toluene (2:1 by weight) were added to the ink composition. The resulting mixture was dispersed once again at 32° C., and cooled to room temperature, whereby a thermofusible gelled ink was prepared.

Formation of First Ink Layer

The following components were mixed to obtain a mixture:

| | Parts by Weight |
|---|---|
| Thermofusible gelled ink (prepared above) | 10 |
| solution of vinyl chloride - vinyl acetate copolymer dissolved in a mixed solvent of methyl ethyl ketone and toluene (2:1 by weight) | 3 |
| Azobisisobutyronitrile | 0.1 |

The thus obtained mixture was coated on one side of a 4.5-μm thick polyethylene terephthalate (PET) film, the other side of which was subjected to heat resistance imparting treatment, and dried at 75° C., whereby a first ink layer with a thickness of 8 μm was formed.

Formation of Second Ink Layer

The following components were mixed to obtain a mixture:

| | Parts by Weight |
|---|---|
| Thermofusible gelled ink (prepared above) | 10 |
| 20% solution of vinyl chloride - vinyl acetate copolymer dissolved in a mixed solvent of methyl ethyl ketone and toluene (2:1 by weight) | 3 |

The thus obtained mixture was coated on the above-prepared first ink layer, and dried at 110° C., so that a second ink layer with a thickness of 2 μm was formed on the first ink layer. At the same time, the blowing agent (azobisisobutyronitrile) in the first ink layer was caused to expand at 110° C. to form pores in the first and second ink layers. Thus, a multiple-use thermal image transfer recording medium No. 3 was prepared.

Preparation Example 4

A support provided with a heat-resistant protective layer was prepared in the same manner as in Preparation Example 1.

A first ink layer was formed on the support in the same manner as in Preparation Example 3 except that the vinyl chloride - vinyl acetate copolymer used as the resin component of the first ink layer in Preparation Example 3 was replaced by a nitrocellulose having a molecular weight of 100,000.

On the surface of the above prepared first ink layer, a second ink layer was formed in the same manner as in Preparation Example 1, whereby a multiple-use thermal image transfer recording medium No. 4 was prepared.

Preparation Example 5

A support provided with a heat-resistant protective layer was prepared in the same manner as in Preparation Example 1.

A first ink layer was formed on the support in the same manner as in Preparation Example 3 except that the vinyl chloride - vinyl acetate copolymer used as the resin component of the first ink layer in Preparation Example 3 was replaced by a nitrocellulose having a molecular weight of 100,000.

On the surface of the above prepared first ink layer, a second ink layer was formed in the same manner as in Preparation Example 3 except that the vinyl chloride - vinyl acetate copolymer used as the resin component of the second ink layer in Preparation Example 3 was replaced by cellulose acetate butyrate, whereby a multiple-use thermal image transfer recording medium No. 5 was prepared.

The Young's modulus of each multiple-use thermal image transfer recording medium obtained in the above-mentioned Preparation Examples 1 to 5 was measured by the following method.

Measurement of Young's Modulus

The Young's modulus of each thermal image transfer recording medium was measured by a commercially available measuring apparatus, "Tensilon UTM-II" (Trademark), made by Orientec Co., Ltd., under the circumstances of 25° C. and 50%RH.

| | |
|---|---|
| Length of sample: | 15 cm |
| Width of sample: | 1 cm |
| Distance of chucks: | 10 cm |
| Tensile strength: | 100 mm/min. |

Each of the above multiple-use thermal image transfer recording media for use in the present invention was incorporated in a line thermal printer, and images were transferred four times to an image receiving sheet from the same portion of the recording medium under the following conditions:

| | |
|---|---|
| Thermal head: | Thin-film head type 8 dots/mm |
| Platen pressure: | 230 gf/cm |
| Peeling angle against image receiving sheet: | 45° |
| Energy applied from thermal head: | 20 mJ/mm² |
| Printing speed: | 100 mm/sec |
| Image receiving sheet: | light-weight coated paper having a Bekk's smoothness of 260 sec. |

The density of the images obtained by each time of 1st, 2nd, 3rd and 4th printings was measured by a McBeth desitometer RD-914. The results are shown in the table below.

TABLE

| Recording Medium | Young's Modulus ($kg/mm^2$) | | Image Density | | | |
|---|---|---|---|---|---|---|
| No. | Lengthwise | Crosswise | 1st | 2nd | 3rd | 4th |
| No. 1 | 1350 | 1390 | 1.28 | 1.33 | 1.21 | 1.13 |
| No. 2 | 1420 | 1450 | 1.41 | 1.38 | 1.35 | 1.26 |
| No. 3 | 1280 | 1310 | 1.40 | 1.36 | 1.34 | 1.24 |
| No. 4 | 1410 | 1410 | 1.31 | 1.31 | 1.25 | 1.21 |
| No. 5 | 1390 | 1410 | 1.26 | 1.21 | 1.20 | 1.20 |

The data shown in the above table clearly demonstrate that the multiple-use thermal image transfer recording media for use in the present invention can yield images without causing a substantial decrease in the image density even when the recording media are used repeatedly. In addition, the multiple-use thermal image transfer recording media for use in the present invention are hardly deformed by the applied thermal energy, so that they do not become creased, folded and torn. As a result, the obtained images do not become blurred.

What is claimed is:

1. A multiple-use thermal image transfer recording method comprising the steps of (i) bringing a line thermal head into contact with a multiple-use thermal image transfer recording medium with Young's modulus of 1200 $kg/mm^2$ or more in both a lengthwise and crosswise direction, said transfer recording medium comprises a support and an ink layer formed thereon, with a side of said support opposite to said ink layer of said recording medium being directed to said thermal head, wherein said ink layer comprises (a) to a lower image transfer portion located above said support, said lower image transfer portion comprising a three-dimensional resin network structure and a thermofusible ink component having a melting point suitable for thermal image transfer recording and which is held within said resin network structure, and (b) an upper image transfer portion located on top of said lower image transfer portion, said upper image transfer portion comprising a fine porous resin structure and a thermofusible ink component having a melting point suitable for thermal image transfer recording and which is held within said porous resin structure, with said porous resin structure and said support being connected by said three-dimensional resin network structure, and (ii) applying thermal energy from said line thermal head to said opposite side of said support of said recording medium, thereby causing said ink component contained in said ink layer to transfer to an image-receiving medium.

2. The multiple-use thermal image transfer recording method as claimed in claim 1, wherein each of said lower image transfer portion and said upper image transfer portion forms a layer.

3. The multiple-use thermal image transfer recording method as claimed in claim 1, wherein said multiple-use thermal image transfer recording medium further comprises a heat-resistant protective layer which is provided on said support on opposite side to said ink layer.

4. The multiple-use thermal image transfer recording method as claimed in claim 1, wherein said multiple-use thermal image transfer recording medium further comprises an adhesive layer which is interposed between said support and said ink layer.

5. The multiple-use thermal image transfer recording method as claimed in claim 4, wherein said adhesive layer has a thickness of 0.2 to 2.0 μm.

6. The multiple-use thermal image transfer recording method as claimed in claim 1, wherein said resin for said three-dimensional network structure in said lower image transfer portion and said resin for said fine porous structure in said upper image transfer portion have a glass transition temperature higher than a melting point of said thermofusible ink components contained in said lower image transfer portion and said upper image transfer portion.

7. The multiple-use thermal image transfer recording method as claimed in claim 6, wherein said resin for said three-dimensional network structure in said lower image transfer portion and said resin for said fine porous structure in said upper image transfer portion are selected from a group consisting of vinyl chloride resin, vinyl chloride - vinyl acetate copolymer, polyester resin, epoxy resin, polycarbonate resin, phenolic resin, polyimide resin, cellulose resin, polyamide resin and acrylic resin.

8. The multiple-use thermal image transfer recording method as claimed in claim 1, wherein said thermofusible ink is a thermofusible gelled ink.

9. The multiple-use thermal image transfer recording method as claimed in claim 1, wherein said thermofusible ink comprises a coloring agent and a vehicle.

10. The multiple-use thermal image transfer recording method as claimed in claim 1, wherein said lower image transfer portion of said recording medium has a thickness of 3 to 15 μm.

11. The multiple-use thermal image transfer recording method as claimed in claim 1, wherein said upper image transfer portion of said recording medium has a thickness of 1 to 5 μm.

12. The multiple-use thermal image transfer recording method as claimed in claim 1, wherein said support of said recording medium has a thickness of 2 to 15 μm.

13. The multiple-use thermal image transfer recording method as claimed in claim 1, wherein said upper image transfer portion and said lower image transfer portion each have thickness with said upper image transfer portion having a thickness which is smaller than the thickness of said lower image transfer portion.

* * * * *

UNITED STATES PATENT AND TRADEMARK OFFICE
CERTIFICATE OF CORRECTION

PATENT NO. : 5,179,388

DATED : January 12, 1993

INVENTOR(S) : Kei-ichi Shiokawa, et al

It is certified that error appears in the above-identified patent and that said Letters Patent is hereby corrected as shown below:

Column 2, line 11, delete "Aocordingly", and insert --Accordingly--.

Column 2, line 66, delete "i" and insert --in--.

Column 3, line 63, delete "ar" and insert --are--.

Column 8, line 63, insert --20%-- before "solution".

Column 10, line 63, delete "to".

Column 11, line 22, insert --said-- before "opposite".

Column 12, line 34, insert --a-- before "thickness".

Signed and Sealed this

Thirtieth Day of November, 1993

Attest:

Bruce Lehman

BRUCE LEHMAN

Attesting Officer

Commissioner of Patents and Trademarks